(12) United States Patent
Coulibaly

(10) Patent No.: US 7,095,634 B2
(45) Date of Patent: Aug. 22, 2006

(54) ARC WELDING SET WITH POWER SOURCE AND INVERTER

(75) Inventor: Peyofougou Coulibaly, Saint-Ouen l'Aumône (FR)

(73) Assignees: L'Air Liquide, Société Anonyme á Directoire et Conseil de Surveillance pour l'Etude et l'Exploitation des Procédés Georges Claude, Paris (FR); La Soudure Autogène Française, Paris (FR)

( * ) Notice: Subject to any disclaimer, the term of this patent is extended or adjusted under 35 U.S.C. 154(b) by 0 days.

(21) Appl. No.: 11/053,549

(22) Filed: Feb. 7, 2005

(65) Prior Publication Data

US 2005/0180184 A1    Aug. 18, 2005

(30) Foreign Application Priority Data

Feb. 12, 2004    (FR)    .................................... 04 50251

(51) Int. Cl.
*H02M 3/335*    (2006.01)
*H02M 7/5387*    (2006.01)

(52) U.S. Cl. ........................ 363/21.03; 363/17; 363/98; 363/132

(58) Field of Classification Search .................. 363/16, 363/17, 21.01, 21.02, 21.03, 97, 98, 131, 363/132

See application file for complete search history.

(56) References Cited

U.S. PATENT DOCUMENTS

| 4,727,272 | A |   | 2/1988 | Foch et al. .................. 327/440 |
| 5,486,994 | A | * | 1/1996 | Pouliquen et al. ............ 363/98 |
| 5,615,100 | A | * | 3/1997 | Radecker et al. ............. 363/97 |
| 6,016,258 | A |   | 1/2000 | Jain et al. ..................... 363/17 |
| 6,246,599 | B1 | * | 6/2001 | Jang et al. ................... 363/132 |

FOREIGN PATENT DOCUMENTS

FR    2 564 662    11/1985

OTHER PUBLICATIONS

French Search Report for FR 0450251.

* cited by examiner

*Primary Examiner*—Jessica Han
(74) *Attorney, Agent, or Firm*—Linda K. Russell

(57) ABSTRACT

A welding machine with a power source and an inverter. The inverter has at least one switching leg, made up of switches in series, and an output terminal. The power source has a circuit for controlling the switches by delivering an on-signal or and off-signal. The power source also has a transformer linked to a rectifier. The power source also has a circuit for detecting the voltage that the terminals of each switch of the inverter. A pilot circuit is also present for receiving control and voltage signals. The pilot circuit then sends a pilot circuit to each of the switches. The pilot signal corresponds to an on-command when the control signal corresponds to an on-signal and when the voltage between the power electrodes is very close to zero.

7 Claims, 3 Drawing Sheets

ARC WELDING SET WITH POWER SOURCE AND INVERTER

This application claims the benefit of priority under 35 U.S.C. § 119 (a) and (b) to French Application No. 04 50251, filed Feb. 12, 2004, the entire contents of which are incorporated herein by reference.

BACKGROUND

In the "power electronics" domain, there are now power sources that can deliver DC output voltages which include inverters operating on a "soft-switching" principle.

The electrical circuit diagram of such a known source with a quasi-resonant soft-switching type inverter is represented for reference in FIG. 1 in a functional configuration.

The inverter 2 is connected between a reference terminal 4 and a power supply terminal 6 of a DC voltage source 8.

Switching cells or legs, denoted in general by the reference number 10 and in particular by the references $10_1$ and $10_2$, are arranged in parallel between the terminals 4 and 6 of the voltage source 8. These legs 10 each comprise two switches linked in series between the terminals 4 and 6. The switches are denoted in general by the numeric reference 12 and in particular by the references $12_{1,1}$, $12_{1,2}$, $12_{2,1}$ and $12_{2,2}$.

Each switch 12 conventionally comprises one or more controllable transistors (MOSFET or IGBT for example), at the terminals of which diodes are mounted in anti-parallel fashion.

Furthermore, each switch 12 of each switching leg 10 is also mounted in parallel with a switching-assisting capacitive element, denoted in general by the numeric reference 14 and in particular by the numeric references $14_{1,1}$, $14_{1,2}$, $14_{2,1}$ and $14_{2,2}$.

The switching legs $10_1$ and $10_2$ thus each present an output terminal $16_1$ and $16_2$ taken between the two central switches of each leg.

Moreover, each switch 12 of each leg 10 is linked for its control to a control device 16 external to the inverter 2.

The inverter 2 also comprises a transformer 20, the primary of which is linked in series between the two output terminals $16_1$ and $16_2$ of the switching cells $10_1$ and $10_2$.

Furthermore, an inductive element 22 is linked in series between the primary of the transformer and the output terminal $16_1$ of the cell $10_1$ to form a resonant element.

The secondary of the transformer 20 is in turn linked to a rectifier 24, the output terminals 26 of which form the output of the power source, or, in the context of a welding set, the welding terminals.

The operation and control of such a circuit are known in the state of the art.

The control device 18 delivers only turn-off commands to the various switches 12. The switching from an off state to an on state is achieved spontaneously at zero voltage according to the quasi-resonant soft-switching principle, on receipt of a turn-on command sent by the control device 18.

In practice, the reactive energy stored in the resonance elements, or the capacitive elements 14 and the inductive element 22, to which can be added, if appropriate, the spurious capacitances of the switches 12 and the leakage inductance of the transformer 20, is used to obtain spontaneously, at the output terminals 16 of the legs 20, conditions for switching from the off state to the on state corresponding to a soft switching action.

However, conventionally in such a circuit, the commands to turn off and turn on a switch must be separated in time by a dead time, to ensure that the capacitors are fully discharged so as not to allow a switch for which the voltage at the terminals is not zero to be turned on.

For this, the turn-off and turn-on commands must be perfectly synchronized to prevent any short-circuiting of a switching leg.

This raises major problems in welding sets where the current employed is high, such that, to avoid being exposed to a short circuit, it is best to define long dead times.

The problem that is then raised is how to propose an improved arc welding set comprising a power source and a quasi-resonant soft-switching type inverter, which provides a high level of protection against short circuits.

SUMMARY

The present invention relates to an electric arc welding set comprising a power source and a "quasi-resonant soft-switching" type inverter.

The solution of the invention is a welding set comprising a power source and a quasi-resonant soft-switching inverter comprising means of connection to an electrical energy power source presenting a DC voltage power supply terminal and a reference terminal, the inverter comprising at least one quasi-resonant type switching leg, each comprising an even number of switches connected in series between said power supply and reference terminals and including an output terminal taken between the two central switches of said leg, each switch being connected in parallel to a capacitive element and in series to an inductive element forming resonance elements, the source further comprising a circuit controlling said switches delivering control signals to said switches corresponding to turn-off and turn-on commands and a transformer, the primary element of which is linked to said output terminals of the switching legs, and the secondary of which is linked to a rectifier delivering a power source output DC voltage, said power source also comprising a circuit detecting the voltage between the power electrodes of each switch of the inverter delivering voltage signals and a pilot circuit receiving said control signals sent by the control circuit as well as said voltage signals and designed to deliver to each switch a pilot signal corresponding to a turn-off command when said control signal corresponds to a turn-off command and/or when the voltage between the power electrodes is substantially different from zero and corresponding to a turn-on command when said control signal corresponds to a turn-on command and when the voltage between the power electrodes is substantially zero.

The use of the circuit of the invention therefore makes it possible to produce a set with power source comprising an inverter, the switches of which can be turned on only when they present a near-zero voltage between their power electrodes.

Depending on the case, the set according to the invention can include one or more of the following features:

each detection circuit is designed to supply a voltage signal with two logical states, a high state corresponding to a substantially zero voltage between the power electrodes and a low state corresponding to a voltage substantially different from zero, said pilot circuit delivering to each switch a pilot signal with two logical states, a high state on receiving a turn-on command simultaneously with detection of a substantially zero voltage, and a low state in all other cases;

said pilot circuit comprises logic units each receiving as input a control signal intended for a switch and a voltage signal at the terminals of said switch to deliver a pilot signal to it;

said switches are controlled in pairs and said pilot circuit comprises logic units, each receiving a control signal intended for two switches and voltage signals at the terminals of each of said switches to deliver the same pilot signal to them;

each detection circuit comprises a generator producing a reference voltage of very low value compared to the maximum voltage between the power electrodes and a comparator designed to deliver a voltage signal dependent on the relative values of the reference voltage and of the voltage between the power electrodes;

said transformer is a coupled planar transformer comprising two elements in series in the primary and two elements in parallel in the secondary.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

In the text that follows, a set of components of the same type is denoted using a single general numeric reference while each component of this set is denoted using this numeric reference with an index. These indices are allocated according to a matrix-oriented notation, the use of two indices separated by a comma corresponding to column and row numbers in that order.

Figure 1:
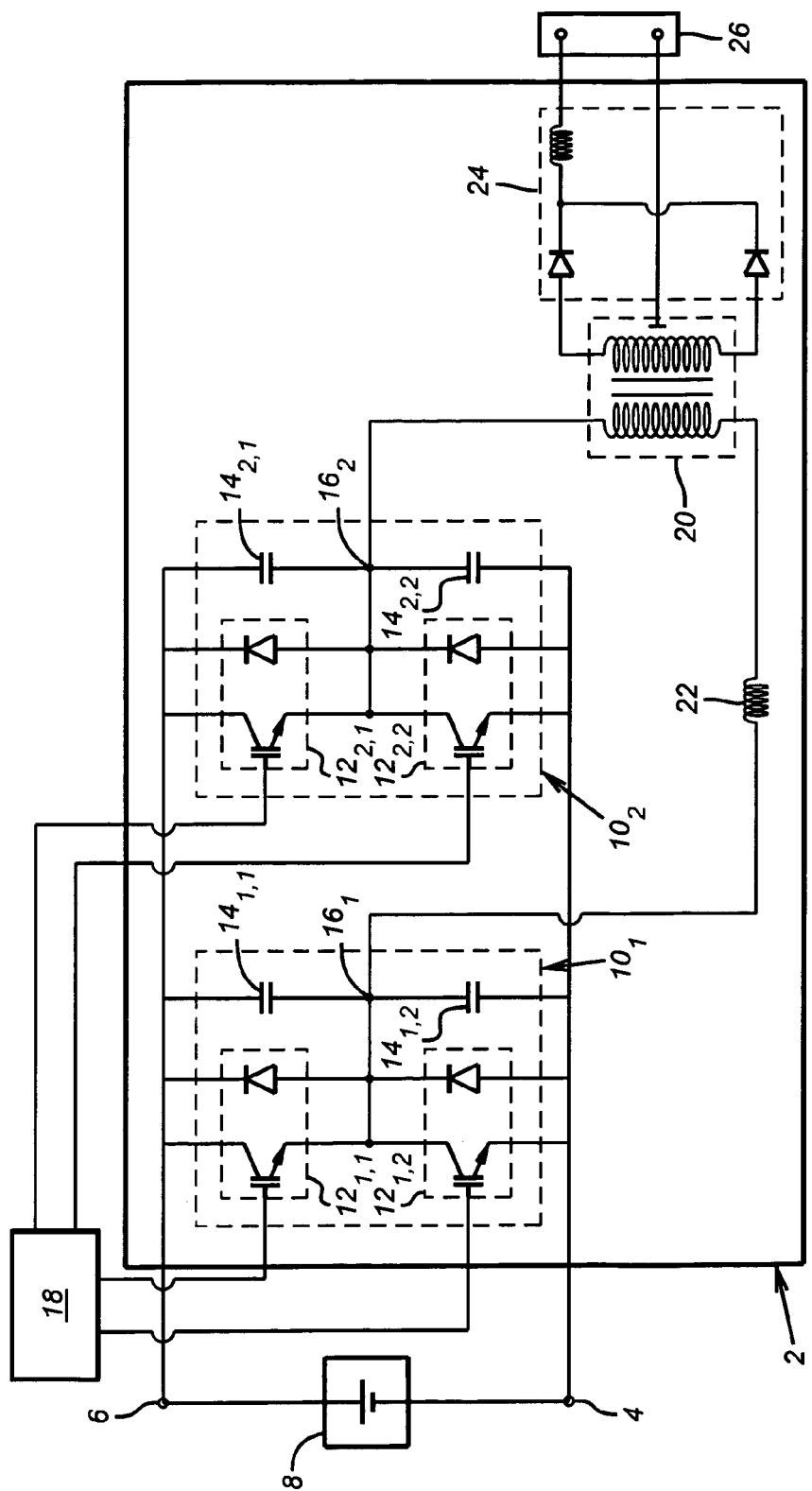
FIG. 1 illustrates a schematic view of a typical electrical circuit of a power source for a welding apparatus.
Figure 2:
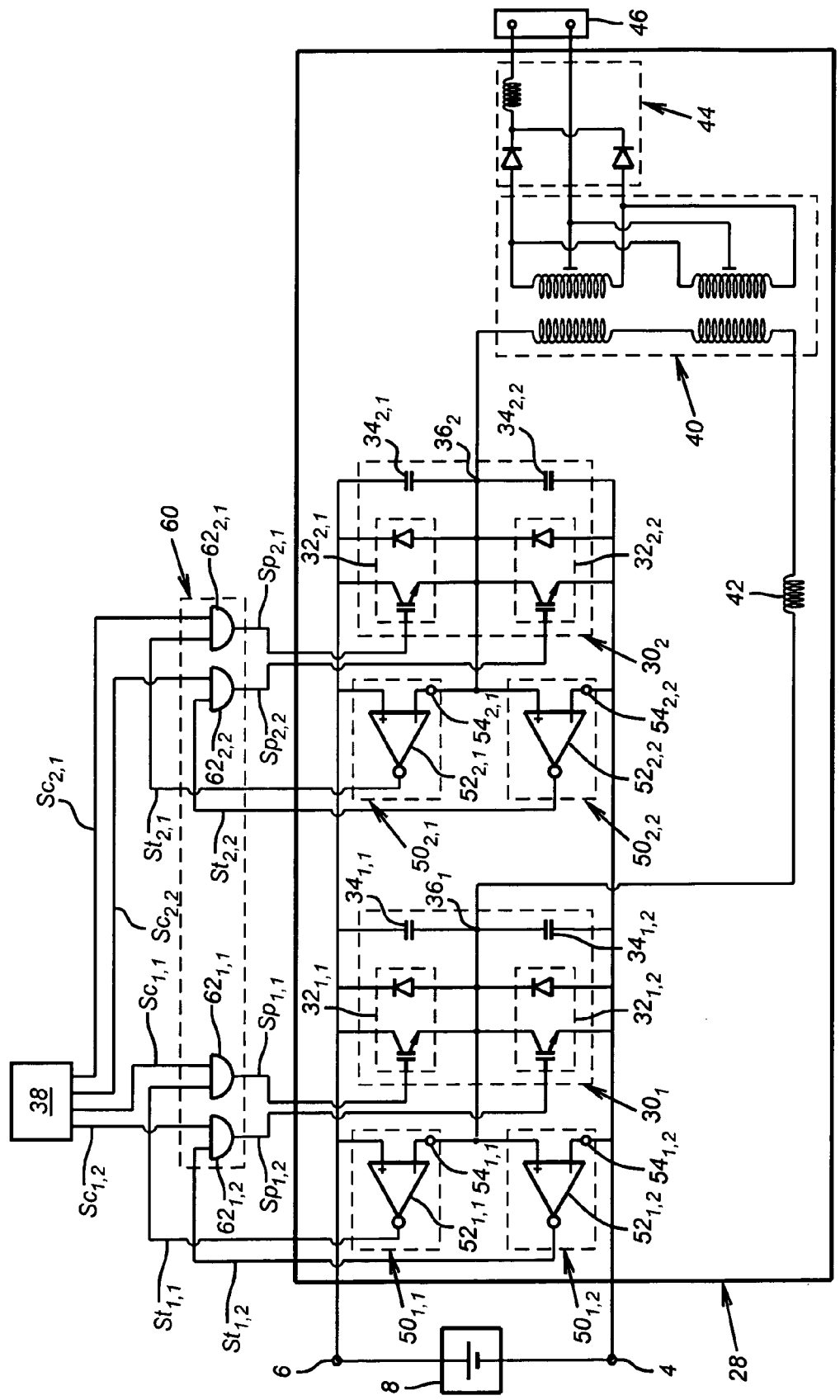
FIG. 2 illustrates an electrical circuit diagram, for one embodiment of the present invention, of a power source for a welding apparatus.

FIG. 2 shows the electrical circuit of a power source for a set according to the invention. It comprises an inverter $28$ which is connected between the reference and power supply terminals, respectively $4$ and $6$, of the DC voltage source $8$ as defined previously with reference to FIG. 1. In the example, the voltage source $8$ delivers a DC voltage of 600 volts.

In the embodiment described, the DC voltage source $8$ is external to the power source of the invention which is connected to its terminals. As a variant, the DC voltage source $8$ can be incorporated in the power source of the invention.

The inverter $28$ comprises two switching legs $30_1$ and $30_2$, arranged in parallel between the terminals $4$ and $6$ and each comprising switches linked in series between the terminals $4$ and $6$. These switches are denoted in general by the numeric reference $32$ and in particular by the references $32_{1,1}$, $32_{1,2}$, $32_{2,1}$ and $32_{2,2}$. They each comprise, conventionally, two power electrodes and a control electrode.

The switches $32$ are each also arranged in parallel with a capacitive element $34$ assisting switching and forming a resonance element. For example, the switches $32$ are MOS-FET type switches such as, for example, the components denoted IXKN45N80C and the capacitive elements $34$ are 2.2 nanofarad (nF) capacitors.

The switching leg $10_1$ presents an output terminal $36_1$ between the two switches $32_{1,1}$, $32_{1,2}$ and the switching leg $10_2$ presents an output terminal $36_2$ between the switches $32_{2,1}$, $32_{2,2}$.

The power source also comprises a control device $38$ external to the inverter $28$ and designed for a forced turn-off control of the switches $32$ and their spontaneous turning-on. Such a control is provided conventionally, each of the switches $32$ receiving a signal $SC_{1,1}$, $SC_{1,2}$, $SC_{2,1}$ and $SC_{2,2}$ conveying turn-off and turn-on commands.

The control signals Sc of the switches $32$ of a particular leg are complementary to each other and are symmetrical, in other words, the control signals of two opposite switches of two different legs are identical.

Thus, the signals $SC_{1,1}$ and $SC_{2,2}$ are identical, as are the signals $SC_{1,2}$ and $SC_{2,1}$. The switches $32$ are said to be controlled in pairs.

The inverter $28$ is linked to a transformer $40$, the primary of which is linked in series between the outputs $36_1$ and $36_2$ of the two switching cells $30$.

In the embodiment, the transformer $40$ is a coupled planar transformer of twice 10.5 kW, the primary coils being in series and the secondary coils being in parallel. Such a transformer is conventional in power electronics and will not be described further in detail.

The inverter $28$ also comprises an inductive element $42$ arranged in series between the output terminal $36_1$ of the first switching leg $30_1$ and the primary of the transformer $40$.

In the example, the inductive element $42$ is a 3 microhenry (µH) inductor.

The secondary of the transformer $40$ is linked to a conventional type rectifier $44$ using DSEP 2×101 diodes (400 volts of twice 100 A), and a 5 µH inductor.

The output terminals of the rectifier $44$ directly form the output terminals of the power source and are denoted by the reference $46$.

Moreover, a detection circuit $50$ is positioned between the power electrodes or terminals of each of the switches $32$.

Each of these circuits $50$ comprises an inverting comparator $52$, connected between the terminals of the switches $32$, to compare the voltage levels on each of the terminals, or to compare the voltage at the terminals of the switches $32$ with zero.

For each detection circuit $50$, a reference voltage generator $54$ is also inserted between an input terminal of the comparator $52$ and a terminal of a switch $32$.

This reference voltage is low compared to the maximum voltage that can appear between the power electrodes of a switch $32$, for example around 17 V.

Thus, each circuit $50$ can be used to detect a zero or near-zero voltage at the terminals of a switch $32$. The detection of such a voltage is reflected by the transmission of a voltage signal St which is in a high logical state when the voltage at the terminals of the corresponding switch $32$ is zero or near-zero and in a low logical state otherwise.

Finally, the device of the invention also comprises an additional control stage formed by a pilot circuit $60$ inserted between the control device $38$ and the switches $32$. This circuit $60$ receives as input the control signals Sc sent by the control device $38$ and the voltage signals St sent by the detection circuits $50$.

In the embodiment described, the pilot circuit $60$ comprises a number of logic units $62$ each designed to provide, for each switch $32$, a logical AND function between its control signal Sc and its voltage signal St and deliver a pilot signal Sp to the corresponding switch 32.

Thus, the logic unit $62_{1,2}$ delivers a signal $Sp_{1,2}$ which corresponds to a logical AND function between the control signal $Sc_{1,2}$ intended for the switch $32_{1,2}$ and the voltage detection signal $St_{1,2}$ delivered by the circuit $50_{1,2}$ detecting the voltage at the terminals of the switch $32_{1,2}$.

In the embodiment described, the pilot signal Sp is directly applicable to each of the switches 32.

Depending on the nature of the switches 32, an impedance matching circuit may be inserted between the output of the logic units 62 and the switches 32 to enable a pilot signal appropriate for the switches to be generated.

In operation, the control signals Sc delivered by the control device 38 have two levels corresponding to a high logical state for a turn-on command and a low logical state for a turn-off command.

The pilot circuit 60 therefore transmits a turn-off command by delivering, to each switch 32, a pilot signal Sp of low logical level when it has received a control signal SC of a same logical level and/or when the potential difference at the terminals of the switch 32 is greater than the reference voltage generated by the generator 54, in other words when the signal St is at a low level.

The turn-off commands sent by the control device 38 are therefore directly transmitted to the switches.

However, a turn-on command corresponding to a control signal SC at the high logical level will be transmitted only on detection of a zero or near-zero voltage at the terminals of the corresponding switch, that is, when the voltage detection signal St is also at a high level.

The device of the invention can therefore be used to check that the switches 32 of the inverter 28 receive a turn-on command sent by the control device 38 only when the voltage at their terminals is zero or near-zero.

Such a pilot circuit is described in detail in the document FR-A-2 564 662. More specifically, the reader can refer to the passage from page 3, line 12 to page 6, line 2 in that document.

The application of such a pilot circuit to an inverter forming part of a power source of a welding set can thus be used to prevent a short circuit on a switching leg of the inverter, so reducing the risks associated with the use of such a welding set. Such an application of this pilot circuit to the inverters of the welding sets had never been considered previously and the resulting gain is quite unexpected.

In particular, the overall efficiency of the welding set is significantly enhanced through the elimination of the forced turn-on command and the existing turn-off commands being assisted by the switching-assisting capacitors denoted by the numeric reference 34, the control of such a welding set thus being simplified.

Moreover, as a variant in the context of control of the switches in pairs, the control device sends only two control signals, each intended for two symmetrically opposite switches belonging to two different switching legs.

In this embodiment, the logic units included in the pilot circuit are designed to deliver a single pilot signal distributed to both switches and corresponding to a logical AND function between the control signal and the voltage signals of each of the two switches.

Thus, a turn-off command is sent when the control signal corresponds to a turn-off command and/or detection of a substantially non-zero voltage at the terminals of either of the two switches controlled in pairs.

Conversely, a turn-on command is transmitted only when the control signal corresponds to a turn-on command and when the voltage at the terminals of the two switches controlled in pairs is substantially zero.

Figure 3:
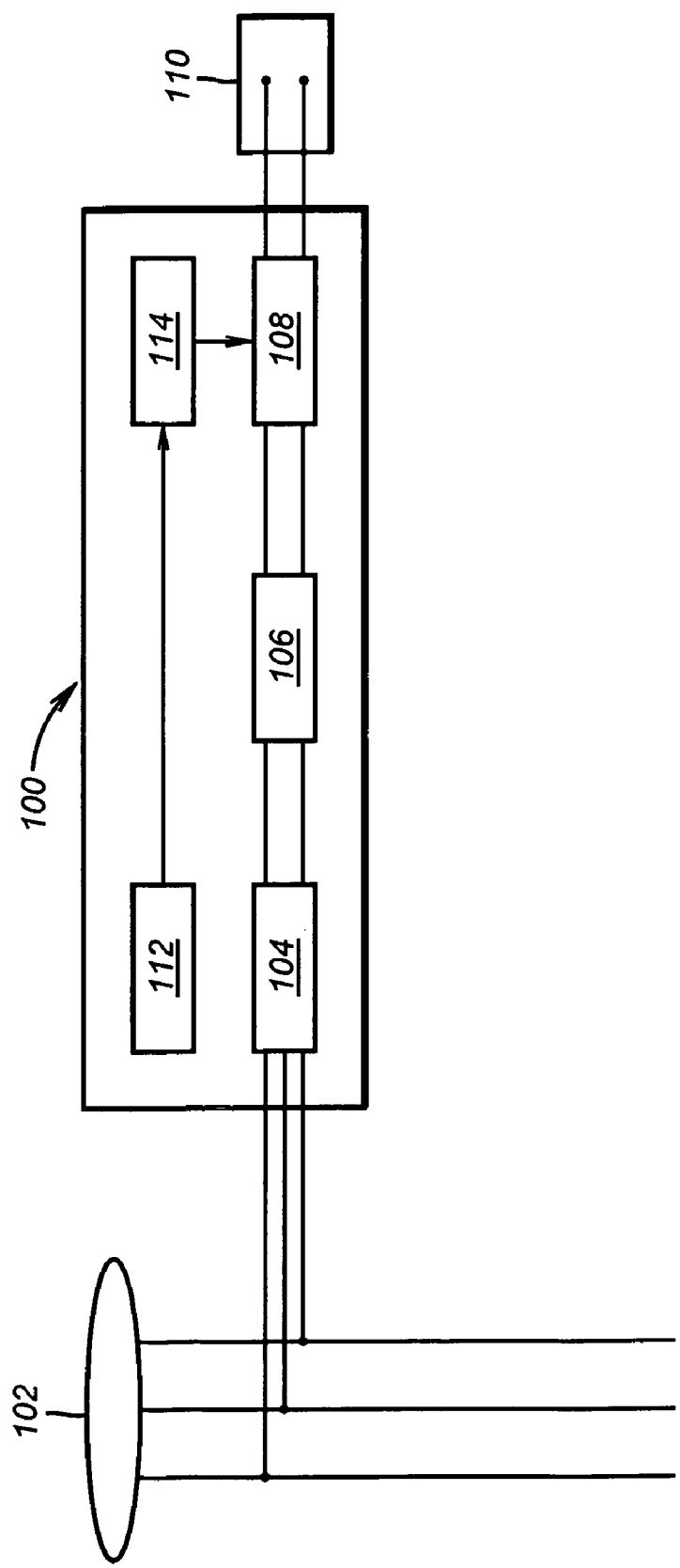
FIG. 3 illustrates a welding apparatus according to one embodiment of the present invention, as seen in a block diagram form.

With reference to FIG. 3, there now follows a description of a welding set employing a power source according to the invention.

The welding set 100 is linked to an electrical energy transfer network such as a three-phase network 102.

The energy received from the three-phase network 102 is received first in insulation means such as, for example, a transformer 104 providing electrical insulation between the welding set 100 and the three-phase network 102.

The transformer 100 delivers a power AC signal to a rectifier 106 forming a DC voltage source to which is connected an inverter 108 corresponding to the inverter 28 as described in FIG. 2.

The transformer 104, the rectifier 106 and the inverter 108 combined in this way form a power converter between an AC voltage source and a DC voltage source.

The output terminals of the inverter 108 are connected to welding terminals 110 forming the welding terminals for arc welding purposes.

Moreover, the welding set 100 also comprises means 112 for entering a set point for welding. This set point is transmitted to a control device 114 corresponding to the control device 38 described with reference to FIG. 2. The control device 114 finally delivers control signals to the inverter 108 to form an output signal at the terminals 110 corresponding to the set point.

The inverter 108 with its output terminals 110 is associated with the control device 114 so forming a power source.

Naturally, different types of controls and set points can be envisaged according to the required applications. In particular, the power source of the invention can be used in a variable duty cycle or phase shift control welding set.

Moreover, the components used, in particular in the inverter, can be produced in various ways.

The switches can conventionally be made of one or more identical transistors or MOSFETs positioned in series, such that the switches overall are unidirectional in voltage mode and bidirectional in current mode and are made of electronic components that are unidirectional in voltage mode and unidirectional in current mode.

The capacitive elements can be made up of a number of capacitors connected in parallel, and the inductive elements can be made up of a number of inductors connected in series.

The number and nature of each of the electronic components used varies according to the maximum voltage and the maximum current applicable between the terminals of each switch.

Moreover, different electronic components can be aggregated, with one and the same component handling a number of functions. The dimensioning of such components must, however, take account of the constraints imposed by the different functions.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An apparatus which may be used for welding, said apparatus comprising:

a) a quasi-resonant soft-switching inverter, wherein said inverter comprises:

1) a connection means to a first power source, wherein said first power source comprises:
   i) a DC voltage power supply terminal; and
   ii) a reference terminal; and
2) at least one quasi-resonant type switching leg, wherein each said leg comprises:
   i) an even number of switches connected in series between said first power source and said reference terminal, wherein;
      aa) each said switch is connected in parallel to a capacitive element; and
      bb) each said switch is connected in series to an inductive element forming resonance element; and
   ii) an output terminal, wherein said output terminal is located between the two central switches of said leg; and
b) an apparatus power source, wherein said apparatus power source comprises:
   1) a control circuit for said switches, wherein:
      i) said control circuit sends a control signal; and
      ii) said control signal comprises at least one member selected from the group consisting of:
         aa) an on-signal; and
         bb) an off-signal;
   2) a transformer, wherein said transformer comprises:
      i) a primary element linked to said output terminal; and
      ii) a secondary element linked to a rectifier, wherein said rectifier delivers a power source output DC voltage;
   3) a detection circuit, wherein:
      i) said detection circuit detects the voltage between the power electrodes of each said switch; and
      ii) said detection circuit sends a detection voltage signal; and
   4) a pilot circuit, wherein:
      i) said pilot circuit receives said control signal and said voltage signal; and
      ii) said pilot circuit sends a pilot signal to each said switch, wherein said pilot signal comprises at least one member selected from the group consisting of:
         aa) an off-signal corresponding to a first set of conditions, wherein said first set of conditions comprises at least one member selected from the group consisting of:
            aaa) said control signal is an off-signal; and
            bbb) said voltage between said electrodes is substantially non-zero; and
         bb) an on-signal corresponding to a second set of conditions, wherein said second set of conditions comprises:
            aaa) said control signal is an on-signal; and
            bbb) said voltage between said electrodes is substantially zero.

2. The apparatus of claim 1 wherein said apparatus power source comprises said first power source.

3. The apparatus of claim 1, wherein:
   a) said detection voltage signal comprises at least one member selected from the group consisting of:
      1) a high logical state signal corresponding to when said voltage between said electrodes is substantially zero; and
      2) a low logical state signal corresponding to when said voltage between said electrodes is substantially non-zero; and
   b) said pilot signal comprises at least one member selected from the group consisting of:
      1) a high logical state signal corresponding to when said control signal is an on-signal, and said voltage between said electrodes is substantially zero; and
      2) a low logical state signal.

4. The apparatus of claim 3, wherein:
   a) said pilot circuit comprises at least one logic unit wherein each said unit receives as input a single said control signal intended for a single said switch; and
   b) said terminals of said single switch receive said pilot signal.

5. The apparatus of claim 3, wherein:
   a) said switches are controlled in pairs;
   b) said pilot circuit comprises at least one logic unit, wherein each said unit receives as input said control signal intended for said pair of switches; and
   c) said terminals of said pair of switches receive the same said pilot signal.

6. The apparatus of claim 1, wherein each said detection circuit comprises:
   a) a generator, wherein:
      1) said generator produces a reference voltage; and
      2) said reference voltage is substantially less than the maximum value of said voltage between said power electrodes; and
   b) a comparator, wherein said comparator is designed to deliver a voltage signal dependent upon the relative values of said reference voltage and said voltage between said power electrodes.

7. The apparatus of claim 1, wherein said transformer is a coupled planar transformer comprising:
   a) two elements in series in said primary; and
   b) two elements in parallel in said secondary.

* * * * *